United States Patent [19]

Tsuru et al.

[11] Patent Number: 4,950,218
[45] Date of Patent: Aug. 21, 1990

[54] MULTIPLE POT FOR RAISING AND TRANSPLANTING SEEDLINGS AND METHOD OF FABRICATING THE SAME

[75] Inventors: Ryuzo Tsuru; Michinori Sakaki; Masashi Tanimura; Sumio Ito; Hidekazu Terasawa, all of Obihiro, Japan

[73] Assignee: Nihon Tensaiseito Kabushiki Kaisha, Tokyo, Japan

[21] Appl. No.: 268,275

[22] Filed: Nov. 7, 1988

[30] Foreign Application Priority Data

Nov. 16, 1987 [JP] Japan .................... 62-287524
Nov. 17, 1987 [JP] Japan .................... 62-174470[U]
Dec. 1, 1987 [JP] Japan .................... 62-301433

[51] Int. Cl.$^5$ .................... B31B 1/62; B31B 17/60
[52] U.S. Cl. .................... 493/346; 493/355; 493/357; 493/335; 493/966; 493/131; 493/132; 493/177; 493/182; 156/197; 47/86; 47/87
[58] Field of Search .................... 47/73, 74, 77, 78, 86, 47/87; 493/84, 86, 90, 110, 131, 132, 142, 177, 182, 966, 346, 355, 356, 357, 381, 335; 156/197, 291, 548, 204, 474

[56] References Cited

U.S. PATENT DOCUMENTS 3,515,036  6/1970  Oki et al. .................... 47/85
4,290,837  9/1981  Bova .................... 156/197

FOREIGN PATENT DOCUMENTS 949319  9/1956  Fed. Rep. of Germany ...... 493/966

Primary Examiner—Frederick R. Schmidt
Assistant Examiner—Jack W. Lavinder
Attorney, Agent, or Firm—Oliff & Berridge

[57] ABSTRACT

The invention relates to a multiple pot comprising individual pots interconnected by connector portions so as to be capable of being pulled out. The multiple pot is used to raise and transplant seedlings of plants. The invention also relates to a method of fabricating the pot. The pot is designed especially to promote growth of roots across the side walls of the individual pots after transplantation. Also, the resistance encountered when the multiple pot is unfolded is reduced. Further, the individual pots are uniform in size. These feature arise from the facts that the connector portions are formed by applying a waterproof paste discontinuously and that a water-soluble paste is not applied around the edges of the individual pots created when the multiple pot is unfolded. Hence, a coating of the paste is formed in none of these portions. The multiple pot is fabricated by continuously carrying out three steps. At the first step, the waterproof paste is applied in a given pattern while continuously pulling out two continuous thin films. At the second step, folds are formed in the resulting belt, and the belt is folded in a zigzag fashion. This state is maintained. At the third step, the water-soluble paste is applied to the front side and the rear side of the belt alternately up to each fold. Then, the belt is folded, and pressure is applied to it to stick together the folded belts.

4 Claims, 4 Drawing Sheets

MULTIPLE POT FOR RAISING AND TRANSPLANTING SEEDLINGS AND METHOD OF FABRICATING THE SAME

BACKGROUND OF THE INVENTION

1. Field of the Invention

The present invention relates to a multiple pot for raising and transplanting seedlings and a method of fabricating the pot and, more particularly, to a multiple pot which consists of a number of individual pots used to raise seedlings and which promotes growth of roots extending across the side walls of the individual pot after the pot seedlings are transplanted in a field, reduces the resistance encountered when the multiple pot is unfolded. Also, the invention relates to a method of fabricating this multiple pot.

2. Description of the Prior Art

Pots consisting of a thin film of paper or the like have been widely used to raise crops. In particular, seedlings are raised within the pots and then transplanted to fields together with the pots, i.e., without removing the pots. Such pots are known as Paperpots. These pots which can be employed to raise and transplant crops take various forms. In recent years, partly or fully automated or mechanized transplantation has been developed especially to save man power and to make the work efficient. A pot suitable for such automated transplantation is disclosed in Japanese Patent Publication No. 30805/1980 corresponding to U.S. Pat. No. 4,132,337 and U.K. Pat. No. 1,559,343. This multiple pot consists of individual pots connected in rows by connector portions and is used in the manner described below. First, plants are raised using this multiple pot in normal manner. Then, the multiple pot is separated into individual pots along separation lines which are formed in the connector portions to facilitate the separation, the separation lines extending from one end of the multiple pot. Subsequently, the separated pots are transplanted to a plant. In this way, when plants are raised using this multiple pot, the individual pots can be pulled from one end of the multiple pot while assuming the form of rows. Therefore, the multiple pot can be divided into the individual pots without substantially requiring man power and then they can be transplanted. This enables fully automatic transplantation work.

A method of fabricating the aforementioned multiple pot is disclosed in Japanese Patent Publication No. 11817/1983. Specifically, two wide thin films of a given width are stuck on each other at regular intervals with waterproof paste to form a belt. Notched lines are then formed in portions excluding the stuck portion at one side end so as to extend through the belt, in order to form separation lines. This belt is divided into strips in such a way that each strip has notched and non-notched portions and that the notched line is located at the front end or rear end of the strip. Every other strip is rotated through 180°. Then, the front ends of the notched portions are aligned. Every other stuck portion is shifted such that a half of one stuck portion is placed on a half of a neighboring stuck portion. Thus, a multilayered structure is formed. Applied and unapplied portions are formed on the right portion and on the left portion near the top of each strip such that they alternate with each other. Waterproof paste is applied to the applied portions, while the paste is not applied to the unapplied portions. Water-soluble paste is applied to the other surface, and the whole surface is stuck. As a result, a multiple pot is fabricated which has separation lines including successive notches either at the upper side or at the lower side of each connector portion between individual pots.

The above-described known method involves manifold manufacturing steps and is complex. Hence, uninterrupted fabrication of multiple pots is difficult to realize. Thus, a more efficient manufacturing method has been desired.

In the known multiple pot disclosed in the above-cited Japanese Patent Publication No. 30805/1980 corresponding to U.S. Pat. No. 4,132,337 and U.K. Pat. No. 1,559,343, the individual pots are connected together so as to form rows. The structure of this multiple pot is preferable, becomes it allows transplantation of seedlings in pots by an automatic transplanter, but there remains room for improvement. That is, the growth of roots extending across the side walls of pots after transplantation must be improved. When the multiple pot is unfolded, the individual pots become nonuniform in shape. Also, the resistance encountered at this time must be reduced.

The growth of roots extend across the side walls of pots after transplantation is considered to be important, because it affects the activity of the roots after transplantation. Accordingly, various contrivances have been devised. In the contrivance disclosed in Japanese Utility Model Publication No. 12362/1976, holes are formed in the side wall of each individual pot. In the contrivance disclosed in Japanese Patent Publication No. 30328/1980, a paper pot is specially treated so that a part of the pot may decompose easily. However, in the former structure, water-soluble paste intrudes through the holes when individual pots are assembled, thereby hindering unfolding. In the latter case, it is considerably difficult to prepare raw paper which can be used irrespective or soil conditions and farm environment and hence it is not always satisfactorily used.

A known means for reducing the resistance encountered during unfolding is disclosed in Japanese Patent Publication No. 11287/1980, where discontinuous notches are formed along the folded portions of pots which correspond to the edges created when the multiple pot is unfolded. These notches are plugged up, depending on the kind of the water-soluble paste used. Then, a coating of the dried paste is formed. Further, water-soluble paste intrudes into the notches, resulting in excessive attachment of the thin films.

Because of these circumstances, a multiple pot is desired which promotes growth of roots after transplantation independent of soil conditions and farm environment and which reasonably reduces resistance encountered during unfolding.

SUMMARY OF THE INVENTION

It is an object of the invention to provide a method of fabricating a multiple pot consisting of plural rows of individual pots connected by connector portions, by one continuous process, the connector portions having separation lines for facilitating the separation of the individual pots.

It is another object of the invention to provide a multiple pot which consists of individual pots and promotes growth of roots extending across the side walls of the individual pots after transplantation.

It is a further object of the invention to provide a multiple pot consisting of a number of folded individual pots which experience only a little resistance when they are unfolded and which, therefore, are uniform in shape at all times.

A thin film used to fabricate a novel multiple pot is made of paper or other similar material which has appropriate resistance to decomposition and appropriate physical strength. In particular, when seedlings are raised, they are sprinkled. This moistens the soil. In spite of the moisture and microorganisms existing in the soil, the film should not either become damaged or destroyed. Although limitations are not imposed on the kind of the paper or the material, its examples are: (1) paper made from only natural pulp which is derived from vegetable cellulose by treating it with chemicals to chemically modify it, e.g., resistance to decomposition is imparted to it by closure of hydrophilic group; (2) paper made from mixture of the natural pulp described just above and synthetic fibers; (3) multilayered paper prepared by stacking paper of natural pulp and paper of synthetic fibers by a physical means or via adhesive; (4) paper made from a mixture of natural pulp and synthetic fibers; and (5) paper manufactured by treating paper of natural pulp with an appropriately selected antiseptic.

When a novel multiple pot is fabricated, two long thin films are prepared from one of the aforementioned know papers or the like such that they have a given width. Waterproof paste is applied to the opposite surfaces of the two films in a given pattern while pulling out the films, to stick together the films. The resulting belt is then folded at regular intervals longitudinally right and left alternately in a zigzag fashion. Water-soluble paste is applied to the surfaces of the belt which have been caused to face each other by the fold, and then they are stuck together. In sticking the two thin films together with the waterproof paste, neither all the surfaces of the films nor the whole width of the belt is stuck; rather nonstick portions are formed. When the belt is unfolded, each connector portion has nonstick portions. Opposite sides of each connector portion, i.e., two individual pots, are placed in communication with each other through the nonstick portions. Thus, when the individual pots are separated at the positions of the connector portions, the inside of each individual pot communicates with the atmosphere through the broken opening in the connector portion.

Where plants are raised and transplanted using this multiple pot, growth of roots in the nonstick portions is promoted immediately after the transplantation.

When the water-soluble paste is applied to the folded portions of the belt which face each other, it is not applied to the portions which become the edges of the pots when the belt is unfolded. Therefore, a coating of the water-soluble paste is not formed on these portions. Consequently, when the finished multiple pot is unfolded, it can be easily done. Further, the individual pots are uniform in shape.

The optimum method of fabricating the multiple pot which promotes growth of roots and can be easily unfolded consists of a combination of three steps. These steps are carried out continuously to efficiently fabricate the multiple pot in an uninterrupted manner.

DETAILED DESCRIPTION OF THE INVENTION

The present invention provides a multiple pot consisting of two appropriate continuous thin films. In the multiple pot, connector portions alternate with individual pots with no breaks between them. After transplantation roots are made vigorously and grow across the side walls of the individual pots. Also, the multiple pot can be easily unfolded. Further, the individual pots are uniform in shape. The invention also provides a method of fabricating such a multiple pot in one uninterrupted process.

Figure 1:
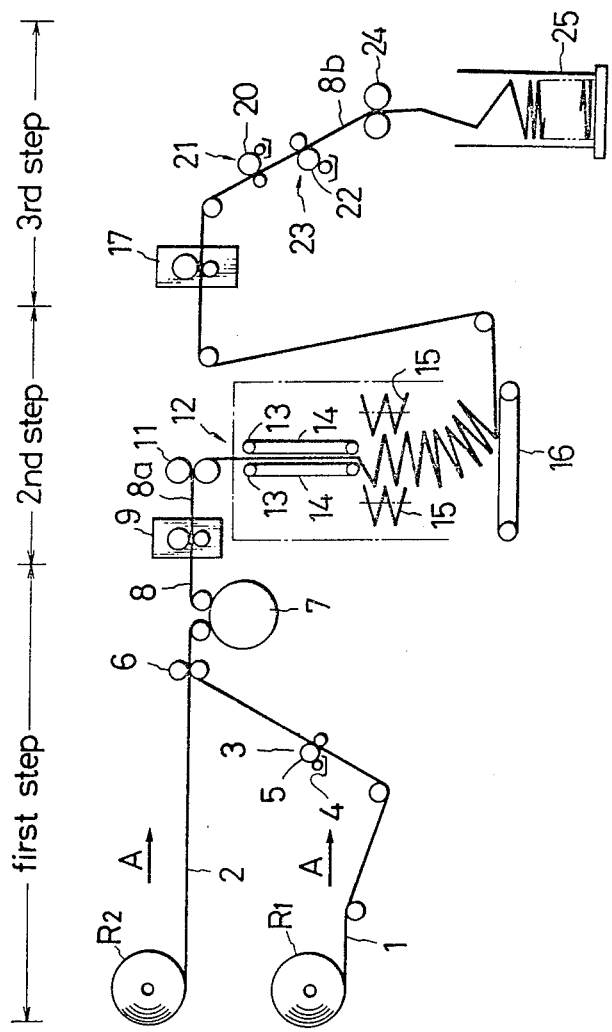
FIG. 1 is a schematic flow sheet illustrating a process of fabricating a multiple pot according to the invention.

A process of fabricating a multiple pot according to the invention is now described by referring to FIG. 1. This process comprises a first step, a second step, and a third step.

At the first step, water-proof paste is applied to one of two long beltlike thin films 1 and 2 at regular intervals longitudinally of the film. The films are stuck together with the paste to form a belt 8. More specifically, rolls $R_1$ and $R_2$ of previously selected thin films are prepared. The first thin film 1 and the second thin film 2 are pulled continuously from the rolls $R_1$ and $R_2$, respectively, in a direction indicated by the arrow A. A first paste-applying device 3 applies waterproof paste 4 to the upper surface of the first film 1 at a width L at regular intervals in a direction perpendicular to the direction indicated by the arrow A.

Figure 2:
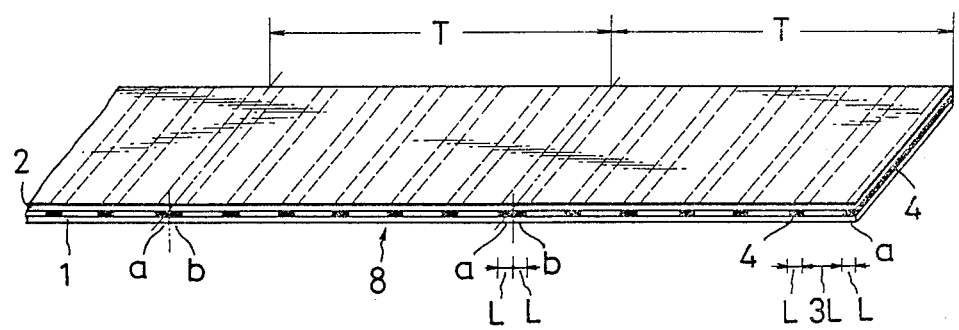
FIG. 2 is a fragmentary perspective view of a belt produced at step 1 shown in the flow sheet of FIG. 1.

Referring also to FIG. 2, the waterproof paste 4 is first applied to a front end portion a having width L on the thin film 1. Then, the neighboring portion of a with of about 3L is not coated with the paste to form an unapplied portion. The paste is applied to the adjacent portion of width L. The paste is not applied to the next portion having a width of about 3L. The paste is applied to the adjacent portion of a width L. In this way, a certain number of applied portions of the width L are formed. The last applied portion is taken as a rear end portion b. The region T between the front end portion a and the rear end portion b is repeated. The paste-applying device 3 has an applying roll 5 which is designed to apply the paste at regular intervals as described above. The operation is controlled by an adequate control mechanism. After the paste 4 has been applied to the thin film 1, pressure rolls 6 align the both side fringes of the films 1 and 2 in the direction of pull indicated by the arrow A and press them against each other to stick them together. If necessary, they are passed through a drier 7 to preliminarily dry them. Thus, a belt 8 as shown in FIG. 2 is formed.

Figure 3:
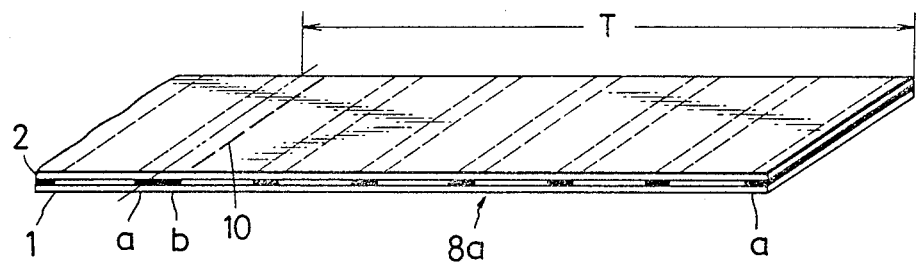
FIG. 3 is a fragmentary perspective view of a belt produced at step 2 shown in the flow sheet of FIG. 1.

At the second step, a fold-forming device 9 forms a fold 10 in the belt 8 fabricated at the first step along the front end of the rear end portion b within the region T as viewed in the direction of pull indicated by the arrow A, in order to facilitate bending this portion. The waterproof paste 4 has been applied to the region T at the width L. The folding operation is performed by forming notches or grooves which do not extend through the belt 8 as shown in FIG. 3. The grooves are formed by the application of pressure. The belt having the folds is indicated by numeral 8a in FIG. 3. The belt 8a is passed through pull rolls 11 and sent to a folding device 12, which ends the belt right and left alternately at the position of the fold 10. Then, the folding device 12 folds it so that it remains folded for a long time. Thus, preparations are made for the next step. The folding device 12 can be of any structure, as long as it bends the belt 8a right and left alternately at regular intervals in a zigzag fashion and folds the bent portions successively as described above. In the example shown in FIG. 1, the folding device 12 comprises a pair of pulleys 13 placed at a high position, a pair of rocking conveyors 14 and a pair of screw guides 15 disposed below the conveyors 14. The conveyors 14 carry the belt 8a while holding it between them and can swing either to the left or to the right as viewed in the figure about the pulleys 13. The amplitude of the swinging movement of the conveyors 14 is set equal to the distance between one fold 10 in the belt 8a and the next fold 10 (not shown). The conveyors 14 bend the belt 8a right and left alternately at the position of each fold 10 while conveying the belt downward. Then, the bent portions are caused to engage screws of the screw guides 15 to fold the belt at the positions of the bent portions successively. The belt 8a bent in this way is once placed on a conveyor 16, which moves the belt forward to unfold it. In this way, the belt is conveyed to the next station where the third step is carried out.

At the third step, a separation line-forming device 17 forms a separation line 18 in the belt 8a in the region T at the width L except for the rear end portion b to make it easy to separate this portion. The belt 8a was bent and folded at the positions of each fold 10 at the second step and remains sufficiently folded. No restrictions are placed on the form of the separation line 18. The form of the separation line is selected according to the condition of transplantation of seedlings in the pots after they are raised. The separation line 18 can be perforations, a broken line, or a separation line having a separation guide portion matching a fully automated transplanter as disclosed in Japanese Patent Publication No. 30805/1980. Subsequently, water-soluble paste 19 is applied to the belt 8a having the separation lines 18 on opposite sides of each fold 10, i.e., on the front surface and the rear surface alternately. The paste 19 is not applied to the portion which has a length corresponding to one side of the side wall of each individual pot and is adjacent to each fold 10. A second paste-applying device 21 disposed aabove the belt 8a applies the water-soluble paste 19 on the upper surface of the belt 8a in a region A extending from the front end of the belt 8a to the first fold 10. Then, a third paste-applying device 23 that is mounted below the belt 8a applies the paste 19 to the lower surface of the belt in a region B between the first fold 10 and the second fold 10. Thereafter, the second paste-applying device 21 applies the water-soluble paste 19 on the surface of the belt 8a in a region C between the second fold and the third fold, in the same manner as the region A. In this way, the water-soluble paste is applied to opposite sides of each successive fold 10, or to the front surface and the rear surface of the belt 8a alternately. The operation of the second paste-applying device 21 and the third paste-applying device 23 is controlled by an appropriate control mechanism so as to operate intermittently, to apply the paste at regular intervals as described above.

Figure 4:
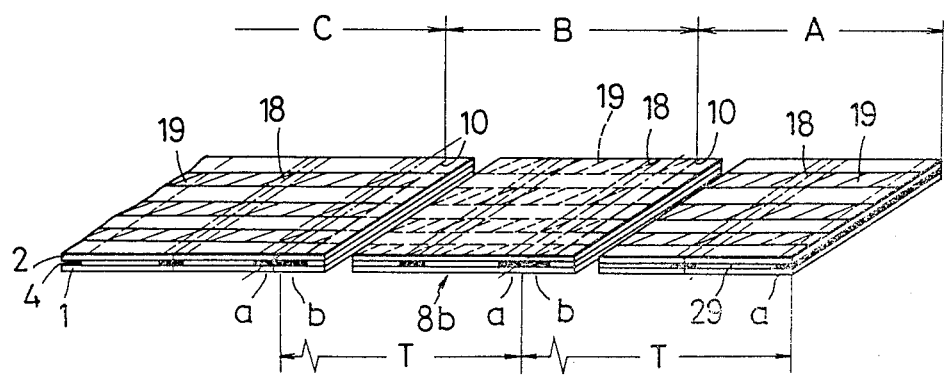
FIG. 4 is a fragmentary perspective view of a belt produced at step 3 shown in the flow sheet of FIG. 1.

After the second paste-applying device 21 and the third paste-applying device 23 apply the paste 19 to the front surface and the rear surface of the belt 8a alternatively, the belt, indicated by numeral 8b in FIG. 4, is bent right and left alternately at the positions of each fold in a zigzag manner. Then, the belt 8b is folded. Pressure is applied to the whole bent belt 8b to stick the portions to which the paste has been applied. For this purpose, the belt 8b moved out of the third paste-applying device 23 is passed between a pair of pull rolls 24 to remote the tension. In this state, the zigzag folds made by the folding device 12 are regained. The belt folded in a zigzag manner accumulate in a box 25 disposed below the pull rolls 24. Then, the belt 8b is taken out of the box 25, and a pressure is applied to the whole belt.

Figure 5:
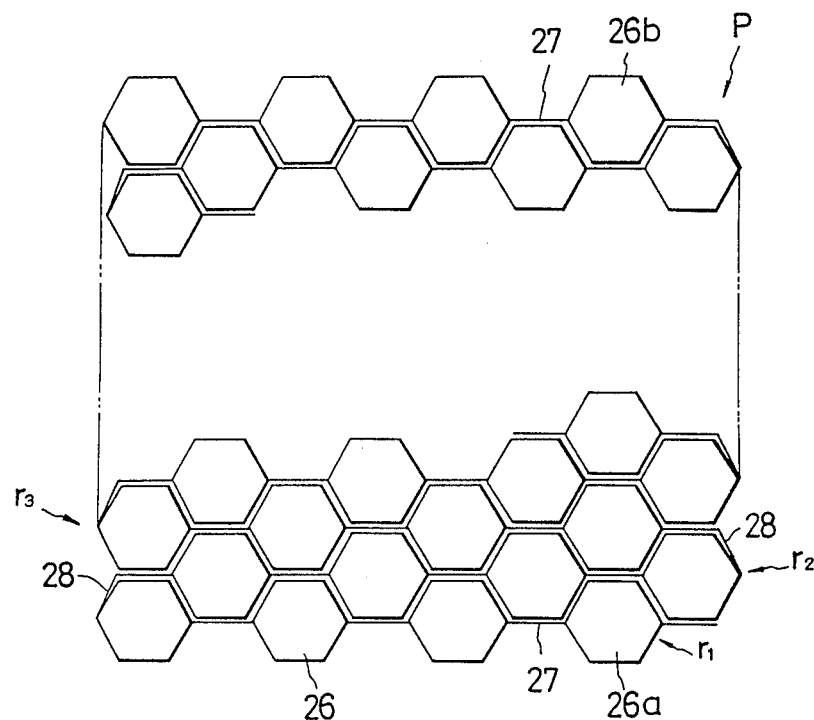
FIG. 5 is a schematic plan view of a multiple pot which is fabricated by the process illustrated in the flow sheet of FIG. 1, and in which the pot is unfolded.

In this way, a folded laminate is obtained by performing the first through third steps continuously. The laminate is dried and unfolded to derive a multiple pot P as shown in FIG. 5. The multiple pot P comprises rows $r_1$, $r_2$, $r_3$, etc. of individual pots 26 each taking the form of a hexagonal prism. The individual pots 26 are interconnected by connector portions 27. The rows $r_1$, $r_2$, $r_3$, etc. are connected by connector portions 28 which are disposed at the left end and the right end alternately. Each row beginning with the initial pot 26a and ending with the final pot 26b can be pulled out.

The relation between the multiple pot P and the belt 8b is next described by referring to FIG. 4. Each pot 26 corresponds to a nonstick portion 29 located between successive portions to which the waterproof paste 4 is applied on the belt 8b. Each connector portion 27 corresponds to the portion stuck with the paste 4 in one region T except for the rear end portion b. Separation lines 18 are formed in the connector portions 27. The connector portions 28 which connect the rows $r_1$, $r_2$, $r_3$, etc. of the pots correspond to the rear end portions b stuck with the paste 4.

In this way, a multiple pot is fabricated from two continuous thin films. The multiple pot comprises a multiplicity of rows $r_1$, $r_2$, $r_3$, etc. of individual pots, and the rows are interconnected by the connector portions. All the individual pots successively connected in rows can be pulled out.

Figure 6:
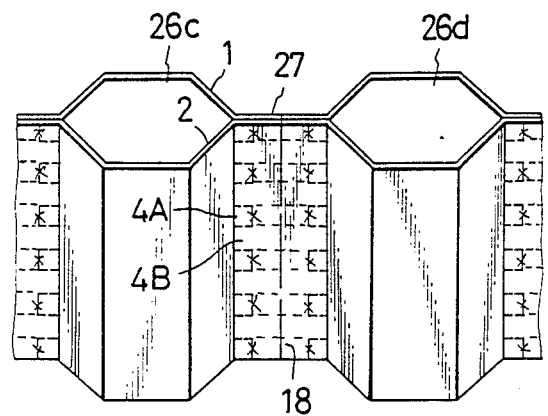
FIG. 6 is a schematic fragmentary perspective view of a multiple pot obtained by applying waterproof paste discontinuously in two rows to the belt shown in FIG. 2, and in which the pot is unfolded.

In the above process, the first through third steps are carried out. At the first step, the first paste-applying device 3 applies the waterproof paste 4 to the first thin film 1. Instead of applying the paste 4 continuously, the paste can be applied to the film 1 discontinuously. For example, the paste is applied so as to form dotted lines, discrete belts, discrete wavy forms, or other discrete figures. One example of a multiple pot obtained in this way is shown in FIG. 6, where the first thin film 1 and the second thin film 2 are stuck together such that stuck portions 4A having the paste 4 alternate with nonstick portions 3B to form connector portions 27. The inside of one individual pot 26c is in communication with the inside of the neighboring individual pot 26d through the nonstick portions 4B, the pots 26c and 26d being on opposite sides of one connector portion 27.

The interval D between the stuck portions 4A affects the growth of roots extending across the side wall of each individual pot. Where the interval D is large, roots grow sufficiently through the nonstick portions 4B of the connector portions 27 after transplantation, but during culture of seedlings it is highly likely that grown roots of the seedlings in the individual pots 26c and 26d on opposite sides of one (connector 27 easily intrude into the nonstick portions 4b) and get entangled with each other. On the other hand, when the interval D is small, the aforementioned young roots are prevented from getting entangled with each other. However, growth of roots from the nonstick portions 4B is suppressed. This is undesirable for the multiple pot. The present applicant examined the interval D satisfying these conflicting, requirements and has found that the allowable range of the interval D is 2 to 5 mm.

Figure 8:
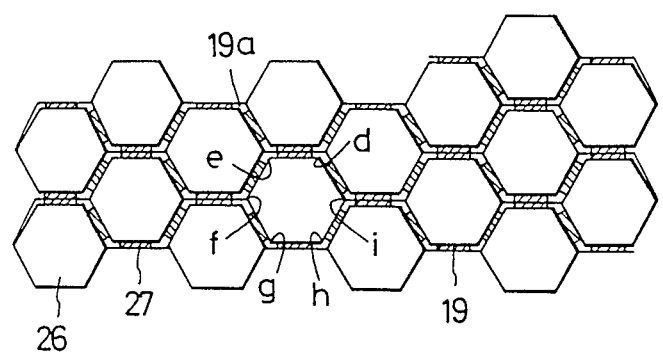
FIG. 8 is a plan view of a multiple pot which is fabricated by stacking and sticking together belts as shown in FIG. 7, and in which the pot is unfolded.
Figure 7:
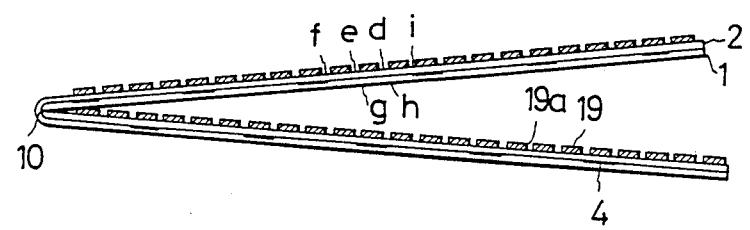
FIG. 7 is a schematic fragmentary side elevation of the belt shown in FIG. 2, for showing the manner in which water-soluble paste is not applied to the portions corresponding to the edges of the multiple pot and the surroundings when the paste is applied to the front side and the rear side alternately of the belt, the edges being formed when the pot is unfolded.

At the third step, the second paste-applying device 21 and the third paste-applying device 23 apply the water-soluble paste 19 to the belt 8a. At this time, if nonstick portions 19a to which the paste is not applied are formed around the edges d, e, f, g, h, i (FIG. 8) of each individual pot 26 which are formed by unfolding the multiple pot as shown in FIG 7, then the unfolding operation is facilitated, because a coating of the water-soluble paste is formed on none of the edges d, e, f, g, h, i of the pot 26. Further, the individual pots are uniform in shape. The center of each nonstick portion is located at the corresponding edge, and the nonstick portion has a width of 2 to 3 mm. Some specific examples of the invention are given below.

EXAMPLE 1

A roll of kraft paper of 390 mm wide was prepared as the first thin film. The basis weight of the paper was 60 g/m². The paper contained 3% by weight of antiseptic copper 8-hydroxyquinolinolate. The paper was pulled out continuously from the roll and, at the same time, waterproof paste consisting of a polyacrylic emulsion adhesive was applied to the surface of the paper at right angles to the direction of pull. A margin to paste up was formed from the front end of the pulled paper. The width of the margin was 10 mm. A neighboring portion of 30 mm wide was formed as an unapplied portion. Then, a margin was formed adjacent to the unapplied portion. The width of this margin was 10 mm. Formed adjacent to this margin was an unapplied portion of 30 mm wide. A unit region ranging from the first margin of 10 mm wide to the eleventh margin of 10 mm wide is repeated in applying the waterproof paste. The second thin film is made of the same kraft paper. The second thin film was pulled out, and both side ends of the second thin films were aligned with both side ends of the first thin film to which the paste has been applied as described above. Then, the second film was stuck on the first film to form a belt 8 as shown in FIG. 2. At the boundary between two successive unit regions on the belt, the margin located at the rear end of the preceding unit region was followed by the margin located at the front end of the following unit region. As a result, a margin of 20 mm wide was formed to paste up.

The belt 8 was dried with a cylindrical surface drier, and then each fold 10 mm formed along the boundary between the margin of 10 mm wide and the unapplied portion of 30 mm wide at the end of each unit region as shown in FIG. 3. In the fold 10, notches of 1.5 mm long alternated with non-notched portions of 1.5 mm long over the whole width of the belt. The notches do not extend through the belt. The belt was folded right and left alternately at the positions of the folds 10 by the folding device 12 as shown in FIG. 1. The belt was then carried on the conveyors while maintained in the folded condition. Thereafter, the belt was moved so as to be stretched and then pulled out. The separation lines 18 extending over the whole width of the belt 8a were formed in the centers of the margins of 10 mm wide. In each of the separation lines 18, notches of 21 mm long alternated with non-notched portions of 5 mm long, the notches extending through the belt 8a. The belt was passed through the second paste-applying device 21 and the third paste-applying device 23. Water-soluble paste 19 consisting of a polyvinyl alcohol adhesive was applied to the front side and the rear side of the belt 8a alternately up to the fold 10 except for the region of 10 mm long adjacent to the fold 10. The belt folded in a zigzag manner was allowed to drop into a stacking container 25 and received there. Every 140 folded portions of the belt 8a were taken out as a unit. Then, pressure was applied to this unit, and the portions having the paste were stuck. The obtained laminate was dried and cut at intervals of 130 mm parallel to the direction of folding, i.e., longitudinally of the belt 8a. Finally, the laminate was unfolded to obtain a multiple pot consisting of rows of 1400 individual pots connected by the connectors of 10 mm wide. Each connector portion had a separation line in its center. The diameter of each individual pot was 20 mm, and the height was 130 mm.

EXAMPLE 2

The first thin film was made of kraft paper having a basis weight of 60 g/m² and a width of 390 mm. The paper contained 8% by weight of antiseptic copper 8-hydroxyquiolinolate. The paper was pulled out continuously and, at the same time, waterproof paste consisting of a polyacrylic emulsion adhesive was applied to it perpendicular to the direction of pull. At this time, a margin of 10 mm wide was formed from the front side of the pulled paper. An unapplied portion of 30 mm wide was formed adjacent to the margin. In this way, portions of 10 mm wide to which paste was applied and unapplied portions of 30 mm wide were alternately formed. A unit region beginning with the first margin of 10 mm wide and ending with the eleventh margin of 10 mm wide was repeatedly formed. The waterproof paste was applied along both ends of each margin discontinuously to form applied portions of 3 m wide and 3 mm long and unapplied portions of 5 mm long. The applied portions alternated with the unapplied portions. A second thin film was made of the same kraft paper and pulled out. Then, the second film was stuck on the first film having the waterproof paste such that both side ends of the second film were alinged with both side ends of the first film to form a belt in which two discrete rows of sticky portions were formed. In each row, portions 4A to which the paste was applied alternated with unapplied portions 4B. The width of the applied portions was 3 mm. At the boundary between two successive unit regions on the belt, a margin located at the rear end of the preceding region connected with the margin formed at the front end of the following unit region. As a result, a margin of 20 mm wide was obtained.

The above-described belt was treated in the same manner as in Example 1 and unfolded to create a multiple pot consisting of 1400 individual pots arranged in rows. Each individual pot had a diameter of 20 mm and a height of 130 mm. The individual pots were interconnected by the connector portions of 10 mm wide. A separation line was formed in the center of each connector portion. The portions stuck with the waterproof paste alternated with the nonstick portions. Seeds of sugar beets were sown in the coil in the multiple pot and raised for 40 days. It was found that roots grown from neighboring individual pots did not get entangled. The multiple pot was separated into individual pot seedlings and transplanted in a field, where the seedlings were raised for 30 days. The growth of the seedlings and the growth of the roots were checked. The average weight of foliage per transplanted seedling was 29.5 g, the average weight of roots was 4.5 g, and the average number of taken roots was 29.0. These values are superior to the average weight of foliage of 16.4 g, the average weight of roots of 2.7 g, and the average number of taken roots of 1.6. The latter values were derived when a multiple pot having portions continuously stuck with the waterproof paste was employed for comparison. In this way, the novel multiple pot was effective in promoting growth of seedlings after they are transplanted.

EXAMPLE 3

The first thin film was made of kraft paper having a basis weight of 60 g/m$^2$ and a width of 390 mm. The paper contained 3% by weight of copper 8-hydroxyquinolinolate. The film was pulled out continuously and, at the same time, waterproof paste of a polyacrylic emulsion adhesive was applied to it at right angles to the direction of pull. A margin of 10 mm wide was formed from the front end of the pulled film. An unapplied portion of 30 mm wide was formed adjacent to the margin. In this manner, margins of 10 mm wide and unapplied portions of 30 mm wide were alternately formed. A unit region beginning with the first margin of 10 mm wide and ending with the eleventh margin of 10 mm wide was repeatedly created. The waterproof paste was applied to these margins. The second thin film was made of the same kraft paper and pulled out. The second film was then stuck on the first film to which the waterproof paste has been applied such that both side ends of the second film were aligned with both side ends of the first film, in order to form the belt 8 shown in FIG. 2. At each boundary between two successive unit regions of this belt, the margin located at the rear end of the preceding unit region connected with the margin situated at the front end of the following unit region. This gave rise to a margin of 20 mm wide.

The belt 8 was dried with a cylindrical surface drier, and then folds 10 were formed over the whole width of the belt as shown in FIG. 3 along each boundary between the margin of 10 mm wide located at the rear end of each unit region and the unapplied portion of 30 mm wide. In each fold 10, notches of 1.5 mm long alternated with non-notched portions of 1.5 mm long. The notches did not extend through the belt. The belt was folded right and left alternately at the positions of the folds 10 by the folding device 12 shown in FIG. 1. Then, the belt was transported onto the conveyors while maintained in the folded state. Subsequently, the belt was shifted and caused to stretch. At the same time, it was pulled out. Separation lines 18 were formed over the whole width of the belt 8a in the center of the margin of 10 mm wide. In each separation line 18, notches of 21 mm long alternated with non-notched portions of 5 mm long. The notches extended through the belt 8a. Thereafter, the belt was passed through the second paste-applying device 21 and the third paste-applying device 23. Water-soluble paste of a polyvinyl alcohol adhesive 19 was applied to the front side and the rear side of the belt 8a alternatively up to each fold 10 except for unapplied portions of 10 mm long adjacent to the folds 10. At this time, unapplied portions 19a of 2 mm wide were formed around the positions corresponding to the edges d, e, f, g, h, i (FIG. 8) of each individual pot formed when the belt was unfolded as shown in FIG. 7. The water-soluble paste was not applied to the unapplied portions 19a, but it was applied to the other portions to form a belt 8b. The belt was subsequently treated in the same manner as in Example 1 and unfolded to give a multiple pot comprising 1400 individual pots connected in rows by connector portions of 10 mm wide. Each individual pot had a diameter of 20 mm and a height of 130 mm. Each connector portion had a separation line in its center. As the water-soluble paste was not applied around the edges, no film of paste was formed in these portions. This made it easy to shape each individual pot into a desired form while the belt was unfolded. Consequently, the individual pots were uniform in shape.

EXAMPLE 4

The first thin film was made of kraft paper having a basis weight of 60 g/m$^2$ and a width of 390 mm. The paper contained 3 % by weight of antiseptic copper 8-hydroxyquinolinolate. The film was pulled out continuously and, at the same time, waterproof paste of a polyacrylic emulsion adhesive was applied to the film at right angles to the direction of pull. At this time, a margin of 10 mm wide was formed from the front end of the pulled film. An unapplied portion of 30 mm was formed adjacent to the margin. In this manner, margins of 10 mm wide and unapplied portions of 30 mm wide were formed alternately. A unit region beginning with the first margin of 10 mm and ending with the eleventh margin of 10 mm wide was repeatedly formed. The waterproof paste was applied discontinuously along both ends of each margin to form alternate applied portions of 3 mm wide and 5 mm long and unapplied portions of 5 mm long. The second thin film was made from the same kraft paper and pulled out. The second film was stuck on the first film to which the paste was applied as described thus far, in such a way that both side ends of the second film were aligned with both side ends of the first film to form a belt having two rows of discrete stuck portions. In each row, portions 4A of 3 mm wide to which the waterproof paste was applied alternate with unapplied portions 4B. At each boundary between two successive unit regions of the belt, the margin located at the rear end of the preceding unit region connected with the margin disposed at the front end of the succeeding unit region and so a margin of 20 mm wide was produced.

This belt was dried with a cylindrical surface drier, and then folds 10 were formed over the whole width of the belt along each boundary between the margin of 10 mm wide located at the rear end of each unit region and the unapplied portion of 30 mm wide was shown in FIG. 3. In each fold 10, notches of 1.5 mm long alternated with non-notched portions of 1.5 mm long. The notches did not extend through the belt. The belt was folded right and left alternately at the positions of the folds 10 by the folding device 12 shown in FIG. 1. Then, the belt was moved onto the conveyors while holding the belt in the folded state. Subsequently, it was transported and pulled out while stretching again. Separation lines 18 were formed over the whole width of the belt 8a in the center of each margin of 10 mm wide. In each separation line 18, notches of 21 mm long alternated with non-notched portions of 5 mm long. The notches extended through the belt 8a. The belt was then passed through the second paste-applying device 21 and the third paste-applying device 23 to apply water-soluble paste of a polyvinyl alcohol adhesive 19 to the front side and the rear side of the belt 8a alternatively up to each fold 10 except for a portion of 10 mm long adjacent to the fold 10. At this time, unapplied portions 19a of 2 mm wide were formed around the positions corresponding to the edges d, e, f, g, h, i (FIG. 8) of each individual pot formed when the belt was unfolded. The water-soluble paste was applied to the other portions to produce the belt 8b. This belt was subsequently treated in the same manner as in Example 1 and unfolded to create a multiple pot consisting of 1400 individual pots connected in rows. Each individual pot had a diameter of 20 mm and a height of 130 mm. The individual pots were interconnected by connector portions of 10 mm wide. Each connector portion had a separation line in its center and was formed by the application of the waterproof paste. In the connector portion, stuck portions alternated with nonstick portions. A coating of the paste was formed around none of the edges. This facilitated unfolding the multiple pot. Further, the individual pots were uniform in shape. In addition, the multiple pot promoted the growth of roots across the side walls of the individual pots after transplantation.

What is claimed is:

1. A method of fabricating a multiple pot in hexagonal shape for raising and transplanting seedlings, comprising:
    a first step consisting of continuously pulling a first thin film having a width and made of paper in a direction of pull, applying waterproof paste to form applied portions, each applied portion being of a width L, perpendicular to the direction of pull to form a given number of applied portions at intervals of 3L within a first region T, repeating this applying operation to form similarly applied portions in other similar regions T, so that a rear end applied portion of at least one region T is adjacent a front end applied portion of a successive region T, to form a paste portion of width 2L, placing and sticking a second thin film on the first thin film to form a continuous belt, the second thin film having the same width as the first film, the second film being made of paper;
    a second step consisting of machining the belt along a front end of each paste portion of width 2L in the direction of pull to make the belt easier to bend, bending the belt in a zigzag fashion about the direction of pull, and folding it; and
    a third step consisting of unfolding the folded belt, forming separation lines in the applied portions except for each paste portion of width 2L, to facilitate separation in the direction in which the paste is applied, applying a water-soluble paste to the front side and the rear side of each region T alternately, folding the belt in the same zigzag fashion as in the second step, and drying and stretching the belt.

2. A method of fabricating a multiple pot for raising and transplanting seedlings as set forth in claim 1, wherein the waterproof paste is applied to the first thin film to form the applied portions in the form of intermittent stuck portions and nonstick portions with intervals therebetween of from 2 to 5 mm.

3. A method of fabricating a multiple pot for raising and transplanting seedlings as set forth in claim 1, wherein the water-soluble paste is applied to the front side and the rear side of each belt alternately except for the portions corresponding to the edges of individual pots to be formed.

4. A method as recited in claim 1, wherein said paper is selected from the group consisting of: (1) paper made from only natural pulp; (2) paper made from a mixture of natural pulp and synthetic fiber; (3) multi-layered paper prepared by stacking paper of natural pulp and paper of synthetic fiber; (4) paper made from a mixture of natural pulp and synthetic fiber; and (5) paper made by treating paper of natural pulp with an antiseptic.

* * * * *